United States Patent
Jang

(10) Patent No.: US 8,356,858 B2
(45) Date of Patent: Jan. 22, 2013

(54) CABIN MOUNTING STRUCTURE FOR CONSTRUCTION MACHINERY

(75) Inventor: Han Kee Jang, Gyeonggi-do (KR)

(73) Assignee: Doosan Infracore Co., Ltd., Incheon (KR)

( * ) Notice: Subject to any disclaimer, the term of this patent is extended or adjusted under 35 U.S.C. 154(b) by 13 days.

(21) Appl. No.: 12/810,732

(22) PCT Filed: Dec. 24, 2008

(86) PCT No.: PCT/KR2008/007651
§ 371 (c)(1),
(2), (4) Date: Jun. 25, 2010

(87) PCT Pub. No.: WO2009/084856
PCT Pub. Date: Jul. 9, 2009

(65) Prior Publication Data
US 2010/0276959 A1    Nov. 4, 2010

(30) Foreign Application Priority Data
Dec. 27, 2007 (KR) .................. 10-2007-0138175

(51) Int. Cl.
*B60J 7/00* (2006.01)
(52) U.S. Cl. ................................ 296/190.07
(58) Field of Classification Search ............ 296/190.07, 296/190.01, 190.03, 190.04, 190.08, 1.03, 296/204, 35.1; 180/89.12, 89.13, 300; 181/207, 181/208; 267/136, 140.13, 141; 244/118.5, 244/119; 188/379, 380
See application file for complete search history.

(56) References Cited

U.S. PATENT DOCUMENTS

| | | | | |
|---|---|---|---|---|
| 3,847,492 A | * | 11/1974 | Kennicutt et al. | 403/224 |
| 3,940,177 A | * | 2/1976 | Miers et al. | 296/35.1 |
| 3,948,341 A | * | 4/1976 | Foster | 180/89.15 |
| 4,014,588 A | * | 3/1977 | Kohriyama | 296/35.1 |
| 4,059,304 A | * | 11/1977 | Yamanaka | 296/35.2 |
| 4,082,343 A | * | 4/1978 | Hurt et al. | 296/190.03 |

(Continued)

FOREIGN PATENT DOCUMENTS

JP    2007139080    6/2007

(Continued)

OTHER PUBLICATIONS

Search Report dated Jul. 9, 2009 for International application No. PCT/KR2008/007651, filed Dec. 24, 2008.

*Primary Examiner* — Kiran B Patel
(74) *Attorney, Agent, or Firm* — John D. Veldhuis-Kroeze; Westman, Champlin & Kelly, P.A.

(57) ABSTRACT

A cabin mounting structure is applied to construction machinery in which a cabin for riding a driver is mounted on a vehicle body, the cabin mounting structure including: an up and down directional vibration damping unit for damping up and down directional vibration of the cabin, the up and down directional vibration damping unit being mounted between the cabin and the vehicle body; and a front and rear directional vibration damping unit for damping front and rear directional vibration of the cabin, the front and rear directional vibration damping unit 3 being mounted between the cabin and the vehicle body, wherein the cabin is connected to the vehicle body to be relatively movable in a front and rear direction.

7 Claims, 4 Drawing Sheets

U.S. PATENT DOCUMENTS

| | | | | |
|---|---|---|---|---|
| 4,451,079 A | * | 5/1984 | Takahashi | 296/190.07 |
| 4,871,189 A | * | 10/1989 | Van Breemen | 267/64.27 |
| 5,209,316 A | * | 5/1993 | Bauer | 180/89.14 |
| 5,551,826 A | * | 9/1996 | Todd et al. | 414/685 |
| 5,701,969 A | * | 12/1997 | Stephens | 180/300 |
| 5,799,930 A | * | 9/1998 | Willett | 267/141.4 |
| 5,964,310 A | * | 10/1999 | Gyllner | 180/89.13 |
| 5,984,036 A | | 11/1999 | Higuchi et al. | |
| 6,302,385 B1 | * | 10/2001 | Summers et al. | 267/140.3 |
| 6,340,201 B1 | * | 1/2002 | Higuchi | 296/190.07 |
| 6,374,935 B1 | * | 4/2002 | Kirschenmann et al. | 180/89.12 |
| 6,439,651 B1 | * | 8/2002 | Johansson et al. | 296/190.07 |
| 6,474,430 B2 | * | 11/2002 | Hamaekers et al. | 180/89.14 |
| 6,478,102 B1 | * | 11/2002 | Puterbaugh et al. | 180/89.12 |
| 6,726,272 B1 | * | 4/2004 | Puterbaugh et al. | 296/190.01 |
| 6,857,674 B2 | * | 2/2005 | Chareyre | 296/1.03 |
| 7,152,842 B1 | * | 12/2006 | Monson et al. | 248/678 |
| 7,162,816 B2 | * | 1/2007 | Otsuka et al. | 37/347 |
| 7,300,100 B2 | * | 11/2007 | McLean et al. | 296/190.07 |
| 7,331,627 B2 | * | 2/2008 | Van Den Brink et al. | 296/190.07 |
| 7,364,223 B2 | * | 4/2008 | Mori et al. | 296/190.07 |
| 7,416,244 B2 | * | 8/2008 | Polk et al. | 296/190.07 |
| 7,568,565 B2 | * | 8/2009 | McFarland et al. | 188/380 |
| 7,607,721 B2 | * | 10/2009 | Grimes et al. | 296/190.01 |
| 7,677,627 B2 | * | 3/2010 | Aoyama et al. | 296/35.1 |
| 7,695,054 B2 | * | 4/2010 | Haeusler et al. | 296/190.07 |
| 7,703,840 B2 | * | 4/2010 | Fukunaga et al. | 296/190.07 |
| 7,712,420 B2 | * | 5/2010 | Scott et al. | 105/342 |
| 7,722,008 B2 | * | 5/2010 | Yoon | 248/638 |
| 7,748,184 B1 | * | 7/2010 | Wheeler et al. | 52/309.1 |
| 2002/0162697 A1 | * | 11/2002 | Taylor et al. | 180/89.13 |
| 2004/0245806 A1 | * | 12/2004 | Mori et al. | 296/187.03 |
| 2006/0071499 A1 | * | 4/2006 | Yoon | 296/35.1 |
| 2010/0127442 A1 | * | 5/2010 | Muragishi et al. | 267/140.14 |
| 2010/0207290 A1 | * | 8/2010 | Wheeler et al. | 264/132 |

FOREIGN PATENT DOCUMENTS

| | | |
|---|---|---|
| KR | 100689292 A | 12/2006 |

* cited by examiner

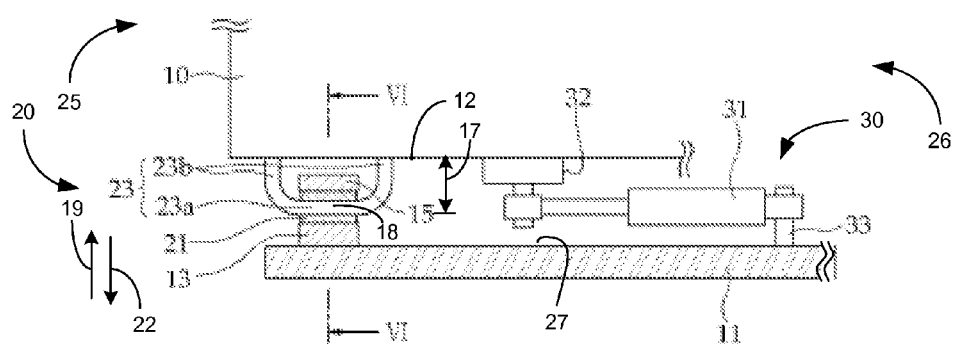
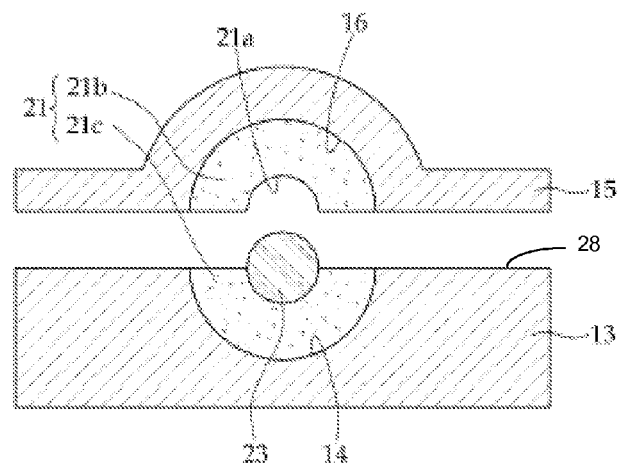

CABIN MOUNTING STRUCTURE FOR CONSTRUCTION MACHINERY

CROSS-REFERENCE TO RELATED APPLICATIONS

This Application is a Section 371 National Stage Application of International Application No. PCT/KR2008/007651, filed Dec. 24, 2008 and published as WO 2009/084856 on Jul. 9, 2009 in English.

FIELD OF THE DISCLOSURE

The present disclosure relates to construction machinery, such as an excavator or a wheel loader, and more particularly to a cabin mounting structure for construction machinery which can not only efficiently damp vibration transferred to a driver in a cabin, but also improve work efficiency.

BACKGROUND OF THE DISCLOSURE

A cabin, a driving compartment, is mounted on a vehicle body of construction machinery, such as an excavator or a wheel loader. In this respect, vibration continuously transferred to a driver through the vehicle body during driving the construction machinery increases driver's fatigue so as to decrease work efficiency and cause safety accidents. It has been reported that vibration of the cabin is harmful to physical health of the driver so that vibration of the cabin has been more strictly regulated.

Especially, as concern about the fact that front and rear directional vibration of the vehicle is greatly affected on health and fatigue of the driver has recently issued, an apparatus for damping front and rear directional vibration is more essentially required.

As schematically illustrated in FIG. 1, the conventional construction machinery is constructed in such a manner that a vibration damping apparatus 2 of a cabin mount and a vibration damping apparatus 3 of a seat share vibration transferred from the vehicle to the driver, respectively, in order to damp vibration of the cabin 1. Both of the vibration damping apparatuses are in charge of damping vertical directional vibration.

Further, for currently issued problem of damping front and rear directional vibration, the conventional construction machinery includes a front and rear directional vibration isolator 6 installed between a seat cushion 4 and a seat body 5.

However, the front and rear directional vibration isolator 6 is effective in damping front and rear directional vibration. However, during the process of damping front and rear directional vibration by the vibration isolator 6, only the seat of the driver is moved in a front and rear direction without moving various operational apparatuses fixed on the cabin body, so that a body of the driver sitting on the seat moves in a front and rear direction with respect to the operational apparatuses, thereby deteriorating safety of operating the vehicle.

The discussion above is merely provided for general background information and is not intended to be used as an aid in determining the scope of the claimed subject matter.

SUMMARY

This Summary is provided to introduce a selection of concepts in a simplified form that are further described below in the Detailed Description. This Summary is not intended to identify dey features or essential features of the claimed subject matter, nor is it intended to be used as an aid in determining the scope of the claimed subject matter.

In accordance with an aspect of a disclosed embodiment of the present invention, there is provided a cabin mounting structure for construction machinery in which a cabin 10 for riding a driver is mounted on a vehicle body 11, the cabin mounting structure including: an up and down directional vibration damping unit 20 for damping up and down directional vibration of the cabin 10, the up and down directional vibration damping unit 20 being mounted between the cabin 10 and the vehicle body 11; and a front and rear directional vibration damping unit 30 for damping front and rear directional vibration of the cabin 10, the front and rear directional vibration damping unit 30 being mounted between the cabin 10 and the vehicle body 11, wherein the cabin 10 is connected to the vehicle body 11 to be relatively movable in a front and rear direction.

In the present embodiment, the up and down directional vibration damping unit 20 includes: at least one elastic means 21 fixed to any one between the cabin 10 and the vehicle body 11; and at least one supporting member 23 fixed to another one between the cabin 10 and the vehicle body 11 and connected to the elastic means 21 capable of being relatively movable in a front and rear direction so as to connect the cabin 10 with the vehicle body 11.

In the present embodiment, the supporting member 23 includes a supporting bar 23a being spaced apart from a lower surface 12 of the cabin 10 in a predetermined distance 17 and a connecting part 23b for connecting the cabin 10 and the supporting bar 23a, and the elastic means is formed to enclose a part of the supporting bar 23a and is fixed to any one between the cabin 10 and vehicle body 11.

In the present embodiment, at least one part of the elastic means 21 is positioned between the cabin 10 and the supporting bar 23a, and the elastic means 21 is compressed when the supporting bar 23a moves in an upper direction so as to elastically support the supporting bar 23a.

In the present embodiment, the vehicle body 11 includes at least one bracket 13 and 15 fixed to an upper surface 27 of the vehicle body 11, the brackets 13 and 15 including recesses 14 and 16 formed along a front and rear direction of the bracket, an elastic body 21 is inserted into an inner surface of the recesses 14 and 16 of the brackets 13 and 15, in which at least one portion of the elastic body 21 being formed in a tube shape, and the supporting bar 23a is inserted into the elastic body 21 to be connected to the vehicle body 11 capable of being slidable in the front and rear direction 24.

In the present embodiment, the brackets 13 and 15 include a lower bracket 13 fixed to an upper surface 27 of the vehicle body 11 and an upper bracket 15 fixed to an upper surface 28 of the lower bracket 13, and the recesses 14 and 16 are formed between the lower bracket 13 and the upper bracket 15.

In the present embodiment, the lower bracket 13 includes a top-sided recess 14, the upper bracket 15 includes a bottom-sided recess 16, and the elastic body 21 is separated upward and downward with respect to the supporting bar 23a to be fixed to the lower bracket 13 and the upper bracket 15, respectively, and the separated elastic body 21 is connected with each other when the upper bracket is assembled with the lower bracket so as to enclose the supporting bar 23a.

In the present embodiment, the front and rear directional vibration damping unit 30 includes a damper 31 of which one end is fixed to the vehicle body 11 and another end of which is fixed to a lower surface of the cabin 10.

In accordance with another aspect of a disclosed embodiment of the present invention, there is provided a cabin mounting structure for construction machinery in which a cabin 10 for riding a driver is mounted on a vehicle body 11, the cabin mounting structure including: an up and down directional vibration damping unit 20 for connecting the cabin 10 and the vehicle body 11 for allowing the cabin 10 to move in a front and rear direction of the vehicle body 11 and damping up and down directional vibration of the cabin 10, the up and down directional vibration damping unit 20 being installed between the cabin 10 and the vehicle body 11.

In accordance with another aspect of a disclosed embodiment of the present invention, there is provided a cabin mounting structure for construction machinery in which a cabin 10 for riding a driver is mounted on a vehicle body 11, the cabin mounting structure including: the cabin installed on the vehicle body 11 to be relatively movable in a front and rear direction of the vehicle body 11; and a damper of which one end is connected to the vehicle body 11 and another end of which is connected to the cabin 10, the damper being installed between the cabin 10 and the vehicle body 11.

Therefore, example embodiments of the disclosure can efficiently damp both front and rear directional vibration and up and down directional vibration transferred from the vehicle body through the up and down directional vibration damping unit and the front and rear directional vibration damping unit.

Further, front and rear directional vibration is not transferred to the seat inside the cabin so that the present invention can efficiently isolate front and rear directional vibration without damaging the operational safety of the driver.

Furthermore, according to a disclosed embodiment of the present invention, the cabin is installed on the vehicle body capable of being relatively movable in a front and rear direction so that front and rear directional vibration can be more efficiently damped by the front and rear directional vibration damping unit.

BRIEF DESCRIPTION OF THE DRAWINGS

The foregoing and other objects, features and advantages of the present invention will become more apparent from the following detailed description when taken in conjunction with the accompanying drawings in which:

FIG. 6 is a side-sectional diagram schematically illustrating an arrangement of an up and down directional vibration damping unit and a front and rear directional vibration damping unit of FIGS. 2 and 3; and FIG. 7 is a cross-sectional diagram schematically illustrating an essential part as taken along line VI-VI of FIG. 6.

DETAILED DESCRIPTION OF ILLUSTRATIVE EMBODIMENTS

Hereinafter, an embodiment of the present invention will be described with reference to the accompanying drawings in detail.

Figure 1:
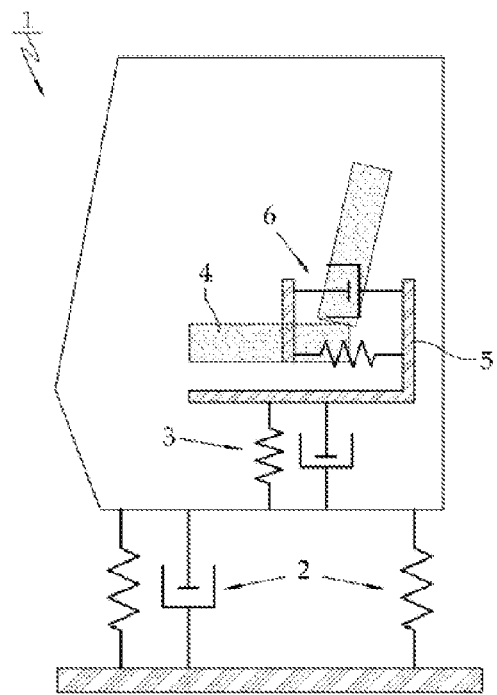
FIG. 1 is a diagram schematically illustrating a concept of a vibration damping means formed in a cabin mounted on a vehicle body of the conventional construction machinery.
Figure 2:
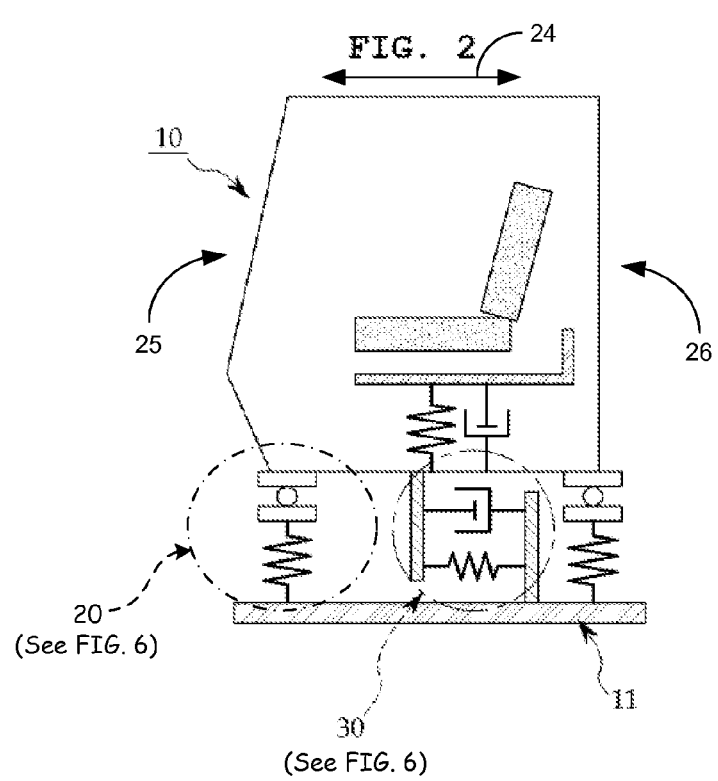
FIG. 2 is a conceptual diagram for efficiently damping vibration transferred from a vehicle body to a cabin of the construction machinery according to an embodiment of the present invention.
Figure 4:
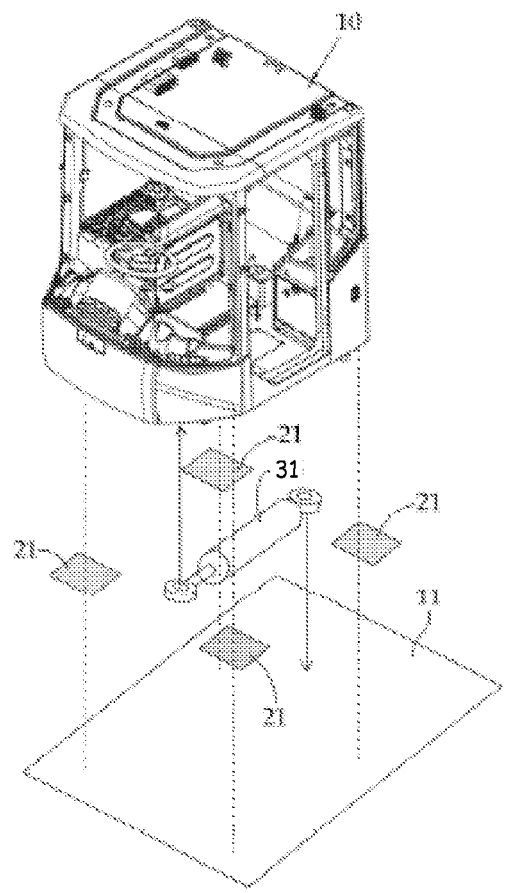
FIG. 4 is a perspective diagram schematically illustrating an arrangement of the vibration damping structure illustrated in FIGS. 2 and 3.
Figure 5:
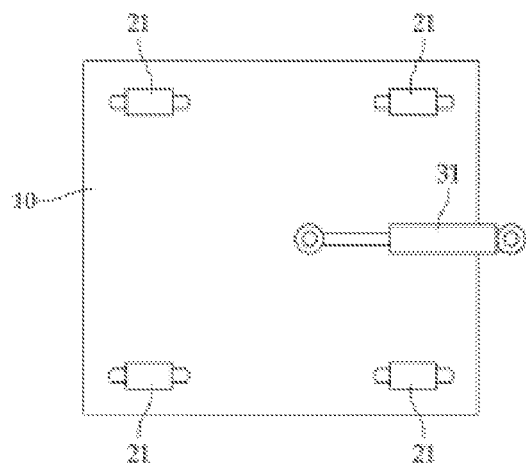
FIG. 5 is a plane diagram illustrating an arrangement of an up and down directional vibration damping unit and a front and rear directional vibration damping unit of FIG. 4.

As illustrated in FIGS. 2, 4, and 5, a cabin mounting structure according to an embodiment of the present invention is for damping both up and down directional vibration and front and rear directional vibration of the whole cabin 10 and includes an up and down directional vibration damping unit 20 and a front and rear directional vibration damping unit 30 mounted between the cabin 10 and a vehicle body 11. The front and rear direction between the front 25 and rear 26 of cabin 10 is represented by arrow 24.

As illustrated in FIG. 6, the up and down directional vibration damping unit 20 includes a supporting member 23 in a rod shape installed at four corners of a lower side of the cabin 10, brackets 13 and 15 fixed to the vehicle body 11 for supporting the supporting member 23 to be slidable in a front and rear direction 24, and an elastic means 21.

The supporting member 23 includes a supporting bar 23a placed being spaced apart from the cabin 10 by a predetermined distance 17 in an up and down direction 19/22 and a connecting part 23b for fixing the supporting bar 23a to a bottom surface 12 of the cabin 10. The supporting bar 23a is placed in a front and rear direction and is installed on the elastic means 21 such that elastic means 21 surrounds part 18 of the supporting bar 23a, and so that supporting bar 23a is capable of being slidable in a front and rear direction 24. The connecting part 23b extends from both ends of the supporting bar 23a in an upper direction and fixed to the bottom surface of the cabin 10. The cabin 10 is connected to the elastic means 21 to be slidable in a front and rear direction through the supporting bar 23a and the connecting part 23b.

The brackets 13 and 15 are fixed to the vehicle body 11 and includes recesses 14 and 16 into which the elastic means 21 is inserted, formed in a front and rear direction of the bracket. More specifically, the brackets 13 and 15 includes a lower bracket 13 assembled with the vehicle body 11 by a fastening means, such as a bolt, and an upper bracket 15 assembled with an upper part of the lower bracket 13. The lower bracket 13 includes a top-sided recess 14 formed on an upper surface 28 thereof and the upper bracket 15 includes a bottom-sided recess 16. At this time, if the lower bracket 13 is assembled with the upper bracket 15, the recesses 14 and 16 come to be formed by the top-sided recess 14 and the bottom-sided recess 16. In the present embodiment, it is exampled that the brackets 13 and 15 are separated from each other, but, unlike this, the bracket 13 and 15 can be integrally manufactured.

The elastic means 21, as illustrated in FIG. 7, includes an elastic body 21 made of elastic materials, such as rubber, and is inserted into the recesses 14 and 16 of the brackets 13 and 15. A hollow part 21a is formed in an inside of the elastic body 21. The supporting bar 23a is inserted into the hollow part 21a. That is, the supporting bar 23a is inserted into the hollow part 21a of the elastic body 21 to be enclosed by the elastic body 21. In this respect, the lower part of the supporting bar 23a is elastically supported by the elastic body 21. If the cabin 10 is moved in an upper direction 19, the upper part of the elastic body 21 is elastically compressed by the supporting bar 23a so as to damp vibration generated in an upper direction 19 of the cabin 10. In the meantime, as described above, the supporting bar 23a is installed on the hollow part 21a of the elastic body 21 to be slidable in a front and rear direction 24. Of course, the elastic body 21 is in charge of damping front and rear directional vibration of the cabin 10 by friction force of an inner surface of the hollow part 21 of the elastic body 21 and the supporting bar 23a. However, most of front and rear directional vibration of the cabin 10 can be damped by the front and rear directional vibration damping unit 30.

In the meantime, the elastic body 21 is separated upward and downward with respect to the supporting bar 23a inserted into the hollow part 21a. That is, the elastic body 21 is separated into an upper elastic body 21b and a lower elastic body 21c, the upper elastic body 21b of the elastic body 21 is inserted into the bottom-sided recess 16 of the upper bracket 15, and the lower elastic body 21c of the elastic body 21 is inserted into the top-sided recess 14 of the lower bracket 13. Therefore, if the upper bracket 15 is assembled with the lower bracket 13, the supporting bar 23a is enclosed by the elastic body 21.

In the present embodiment, the supporting member 23 is fixed to the cabin 10 and the brackets 13 and 15 are fixed to the vehicle body 11. However, unlike the present embodiment, the supporting member 23 can be fixed to the vehicle body 11 and the brackets 13 and 15 can be fixed to the cabin 10. Further, one part of the supporting member 23 may be fixed to the vehicle body 11, the other part of the supporting member 23 may be fixed to the cabin 10, one part of the brackets 13 and 15 may be installed on the cabin 10 corresponding to one part of the supporting member 23, and the other part of the brackets 13 and 15 may be installed on the cabin 10 corresponding to the other part of the supporting member 23.

Further, in the present embodiment, the up and down directional vibration damping unit 20 is installed at four corners of the cabin 10, but the number of the up and down directional vibration damping unit 20 can be varied according to the size of the cabin 10 and damping capability of the up and down directional vibration damping unit 20.

Figure 3:
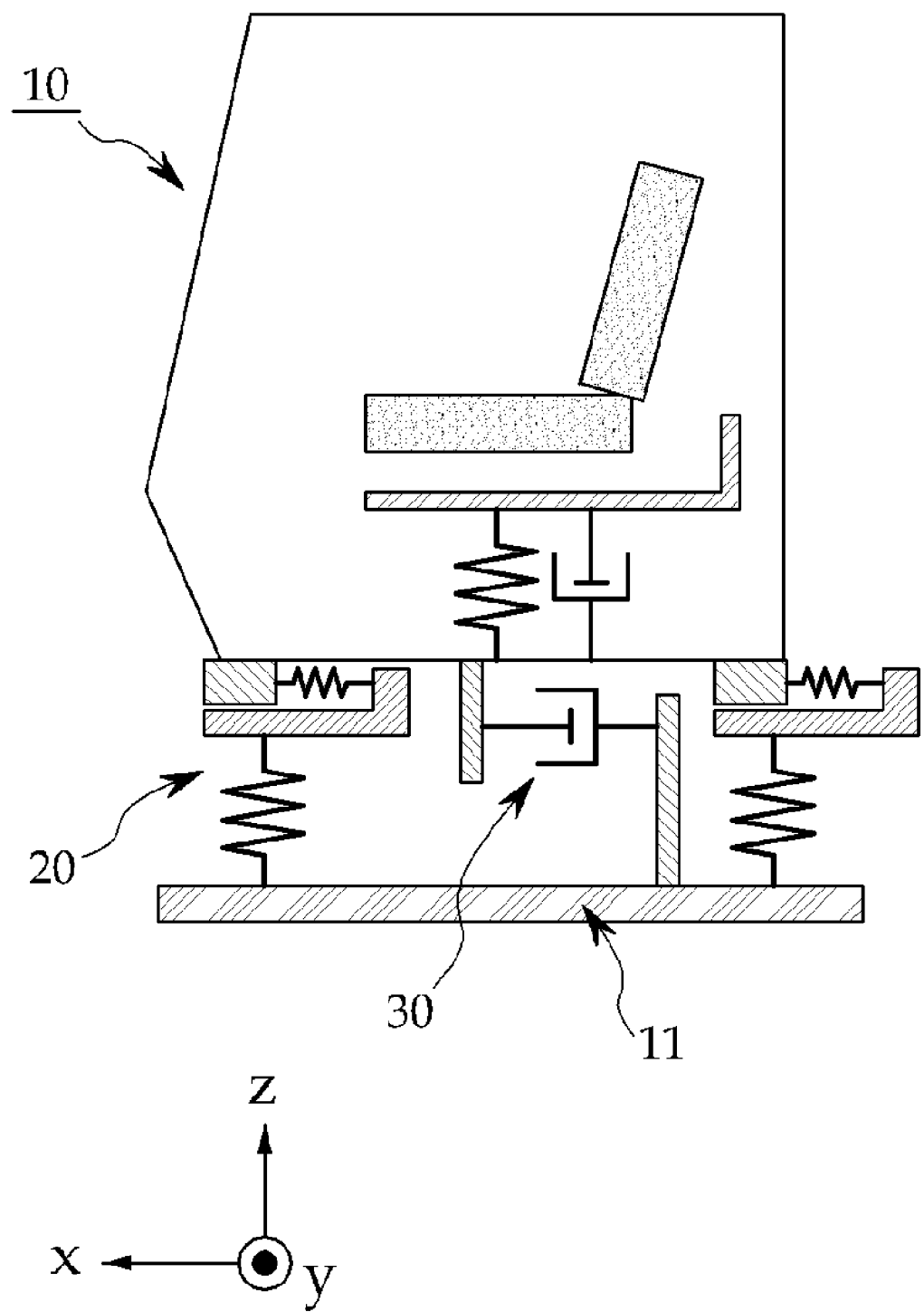
FIG. 3 is a conceptual diagram for illustrating a vibration damping structure for the construction machinery of FIG. 2 from another aspect according to an embodiment of the present invention.

As such, the elastic means 21 is positioned between the upper bracket 15 and the lower bracket 13 to enclose the supporting member 23, so as to restrict excessive up and down directional movement of the cabin 10 and damp vibration, and especially prevent separation of the cabin 10 if the vehicle leans to one side. Further, the elastic means 21 can perform a function of a spring that allows clearance while damping a certain amount of front and rear directional vibration of the cabin 10, so that it can be illustrated unlike FIG. 2, as shown in FIG. 3. In this case, as aforementioned, the front and rear directional vibration damping unit 30 performs a function of a front and rear directional damper for compensating the up and down directional vibration damping unit 20 performing the function of the front and rear directional spring.

In the meantime, it is apparent to those skilled in the art that the shape of the bracket is not limited to a bush shape shown in FIG. 6, but can be formed in other shape.

Such a bush-shaped elastic means 21 efficiently damps the up and down directional vibration, but allows the movement in the front and rear direction within a predetermined range. That is, the front and rear directional vibration of the supporting member 23 can be damped by friction between the elastic means 21 and the supporting member 23 positioned in the elastic means 21 by a certain degree, but the damping degree is not sufficient.

The front and rear directional vibration damping unit 30 includes a damper 31 positioned in a front and rear direction of the vehicle body 11 for ensuring damping the front and rear directional vibration of the cabin 10. One end of the damper 31 is mounted on a fixing part 32 formed on a center of a bottom surface of the cabin 10 and the other end of the damper 31 is mounted on the supporting member 33 fixed to the vehicle body 11. Therefore, the damper 31 damps the front and rear directional vibration of the cabin 10.

Therefore, the up and down directional vibration damping unit 20 formed between the cabin 10 and the vehicle body 11 and including the elastic means 21 formed at 4 corners of the cabin 10 is assembled with the damper 31 of which both ends are fixed between the center of the bottom surface of the cabin 10 and the vehicle body 11 in the front and rear direction of the vehicle 11, so as not only to efficiently damp the front and rear directional vibration, but also to damp the up and down directional vibration.

In the meantime, as an existing suspension apparatus of the seat can excellently absorb vibration, it is preferable to use the existing suspension apparatus of the seat for damping the up and down directional vibration that is not sufficiently damped by the elastic means 21, considering a cost aspect and a work aspect such as modification of a design.

As described above, according to embodiments of the present invention, the front and rear directional vibration of the entire cabin including the seat can be absorbed by the up and down directional vibration damping unit 20 and the front and rear directional vibration damping unit 30 so that the front and rear directional vibration can be absorbed without separation between the driver sitting on the seat and the operating devices.

Further, isolation of the up and down directional vibration is shared by the up and down directional vibration damping unit 20 and the existing suspension apparatus of the seat, respectively. Therefore, the existing suspension apparatus of the seat does not need to be modified so that disclosed embodiments can be efficiently applied without a big cost burden occurring for changing a design of the vibration damping apparatus or re-designing, and effectively achieve damping the front and rear directional vibration without damaging operational safety of the driver.

Although the present disclosure has been described with reference to one or more examples, workers skilled in the art will recognize that changes may be made in form and detail without departing from the scope of the disclosure and/or the appended claims.

The invention claimed is:

1. A cabin mounting structure for construction machinery by which a driver's cabin is mounted on a vehicle body, the cabin mounting structure comprising:

an up and down directional vibration damping unit connecting the cabin and the vehicle body and allowing the cabin to move in a front and rear direction relative to the vehicle body and damping up and down directional vibration of the cabin, the up and down directional vibration damping unit being mounted between the cabin and the vehicle body and comprising at least one elastic means connected to the vehicle body and at least one supporting member connected to the cabin and to the elastic means and being relatively movable in the front and rear direction while the cabin is connected to the vehicle body, wherein the supporting member comprises a supporting bar being spaced apart from a bottom surface of the cabin by a predetermined distance and a connecting part for connecting the cabin and the supporting bar, and wherein the elastic means surrounds a part of the supporting bar.

2. The cabin mounting structure as claimed in claim 1, wherein at least one part of the elastic means is positioned between the cabin and the supporting bar and the elastic means is compressed when the supporting bar moves in the up direction so as to elastically support the supporting bar.

3. The cabin mounting structure as claimed in claim 2, and further comprising at least one bracket having recesses formed along the front and rear direction of the at least one bracket, wherein the at least one bracket is fixed to a top surface of the vehicle body, wherein the elastic means comprises an elastic body inserted into an inner surface of the recesses of the at least one bracket, and the supporting bar is inserted into the elastic body such that elastic body surrounds a part of the supporting bar and thereby connects the supporting bar to the vehicle body so that the supporting bar is slidable in the front and rear direction.

4. The cabin mounting structure as claimed in claim 3, wherein the at least one bracket comprises a lower bracket fixed to a top surface of the vehicle body and an upper bracket fixed to an upper surface of the lower bracket, and the recesses are formed between the lower bracket and the upper bracket.

5. The cabin mounting structure as claimed in claim 4, wherein the recesses include a top-sided recess on the lower bracket and a bottom-sided recess on the upper bracket, and wherein the elastic body is separated upward and downward with respect to the supporting bar to be fixed to the lower bracket and the upper bracket, respectively, and the separated elastic body is connected with each other when the upper bracket is assembled with the lower bracket so as to enclose the supporting bar.

6. The cabin mounting structure as claimed in claim 1, further comprising a front and rear directional vibration damping unit for damping front and rear directional vibration of the cabin.

7. The cabin mounting structure as claimed in claim 6, wherein the front and rear directional vibration damping unit comprises a damper of which one end is connected to the vehicle body and another end of which is connected to a bottom surface of the cabin.

\* \* \* \* \*